United States Patent
Bilac et al.

(10) Patent No.: US 7,791,307 B2
(45) Date of Patent: Sep. 7, 2010

(54) AC MOTOR CONTROLLER

(75) Inventors: Mario Bilac, Lawrenceville, GA (US); Chun Fan, Duluth, GA (US); Paul Terricciano, Roswell, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 7 days.

(21) Appl. No.: 11/545,390

(22) Filed: Oct. 10, 2006

(65) Prior Publication Data

US 2007/0096681 A1    May 3, 2007

Related U.S. Application Data

(60) Provisional application No. 60/727,468, filed on Oct. 17, 2005.

(51) Int. Cl.
*H02P 1/26* (2006.01)

(52) U.S. Cl. .................... 318/778; 318/430

(58) Field of Classification Search .......... 318/430, 318/437, 438, 729, 767, 798–801, 805–817, 318/431, 778, 779
See application file for complete search history.

(56) References Cited

U.S. PATENT DOCUMENTS

| | | | | |
|---|---|---|---|---|
| 3,838,322 A | * | 9/1974 | Greenwell | 318/810 |
| 3,866,097 A | * | 2/1975 | Anzai et al. | 318/761 |
| 3,876,918 A | * | 4/1975 | Komuro et al. | 318/743 |
| 3,935,518 A | * | 1/1976 | Yatsuk et al. | 318/805 |
| 4,052,651 A | * | 10/1977 | Kamaike | 318/812 |
| 5,272,428 A | * | 12/1993 | Spiegel et al. | 318/803 |
| 5,652,485 A | * | 7/1997 | Spiegel et al. | 318/147 |
| 5,774,630 A | * | 6/1998 | Lee et al. | 706/3 |
| 6,000,622 A | * | 12/1999 | Tonner et al. | 236/11 |
| 6,008,618 A | * | 12/1999 | Bose et al. | 318/811 |
| 6,047,275 A | * | 4/2000 | Jaremko et al. | 706/1 |
| 6,326,758 B1 | | 12/2001 | Discenzo | 318/609 |
| 6,711,556 B1 | * | 3/2004 | Sepe et al. | 706/6 |
| 6,757,665 B1 | | 6/2004 | Unsworth et al. | 706/15 |

OTHER PUBLICATIONS

"Fuzzy Logic Based Soft-start for Induction Motor Drives", R.S. Janardhana Iyengar and V.V. Sastry, IEEE; Industry Applications Conference, 1995; pp. 121-128.
"Rapid Prototyping Tool for a Fuzzy Logic Based Soft-starter", M. Rajendra and V.V. Sastry, IEEE; Power Conversion Conference, 1997, pp. 877-880.
"Recent Developments of Induction Motor Drives Fault Diagnosis using AI Techniques", Filippetti, IEEE; IEEE Transactions on Industrial Electronics. vol. 47, No. 5, pp. 994-1004.
"Design of Intelligent Soft-start Controller for Induction Motor", Wen-Xiong Li et al., IEEE—Machine Learning and Cybernetics, 2004, pp. 908-912.
PCT International Search Report, mailed Mar. 13, 2007.

* cited by examiner

*Primary Examiner*—Bentsu Ro
(74) *Attorney, Agent, or Firm*—Jose de la Rosa

(57) ABSTRACT

A system, method, and device for monitoring an AC induction motor are disclosed. The exemplary system provides the architecture of an intelligent motor controller. On one hand, the controller has self-commission and adaptive tuning capability and can provide smooth start and stop for motor driven systems. On the other hand, the controller can provide fault detection, power metering, and history data logging, to ensure motor operates under optimal conditions. The exemplary system may have one or more sensors for monitoring characteristics of the AC induction motor and producing one or more inputs from the characteristics.

19 Claims, 4 Drawing Sheets

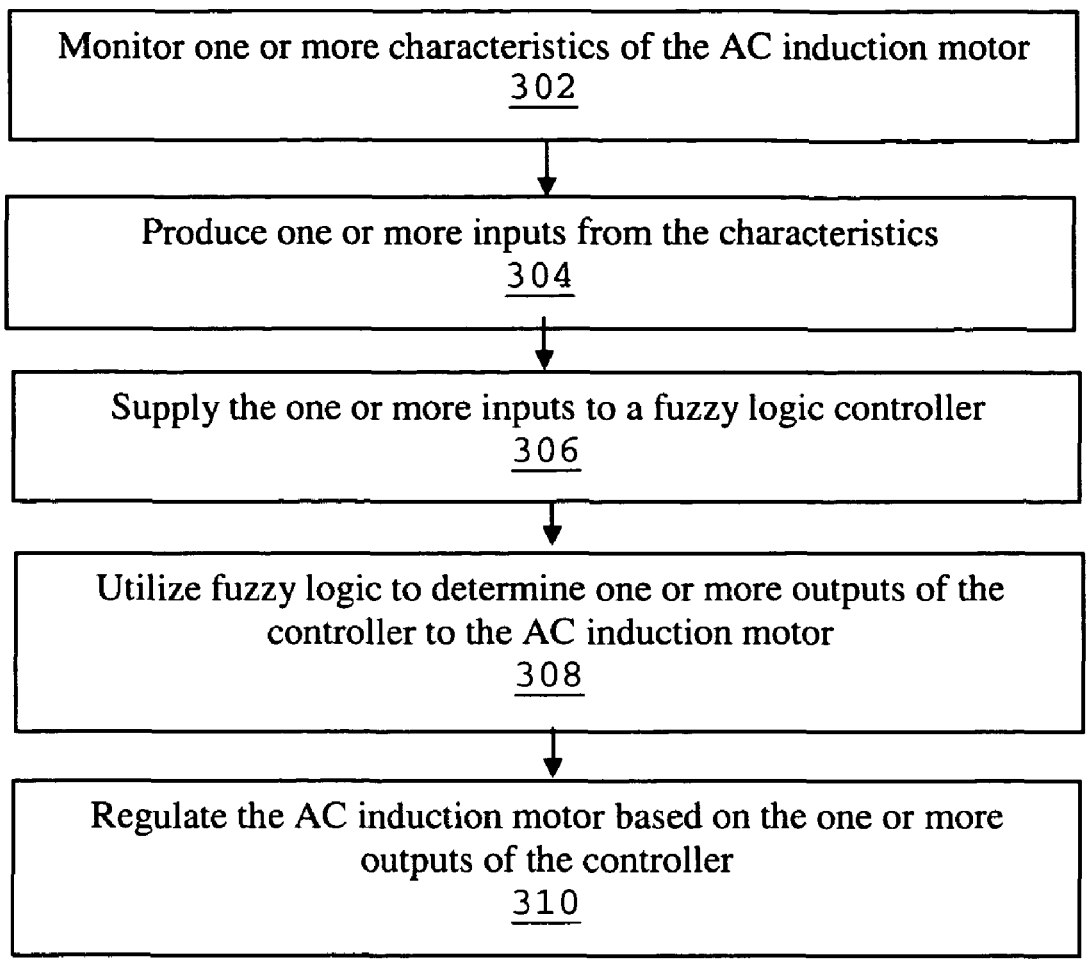

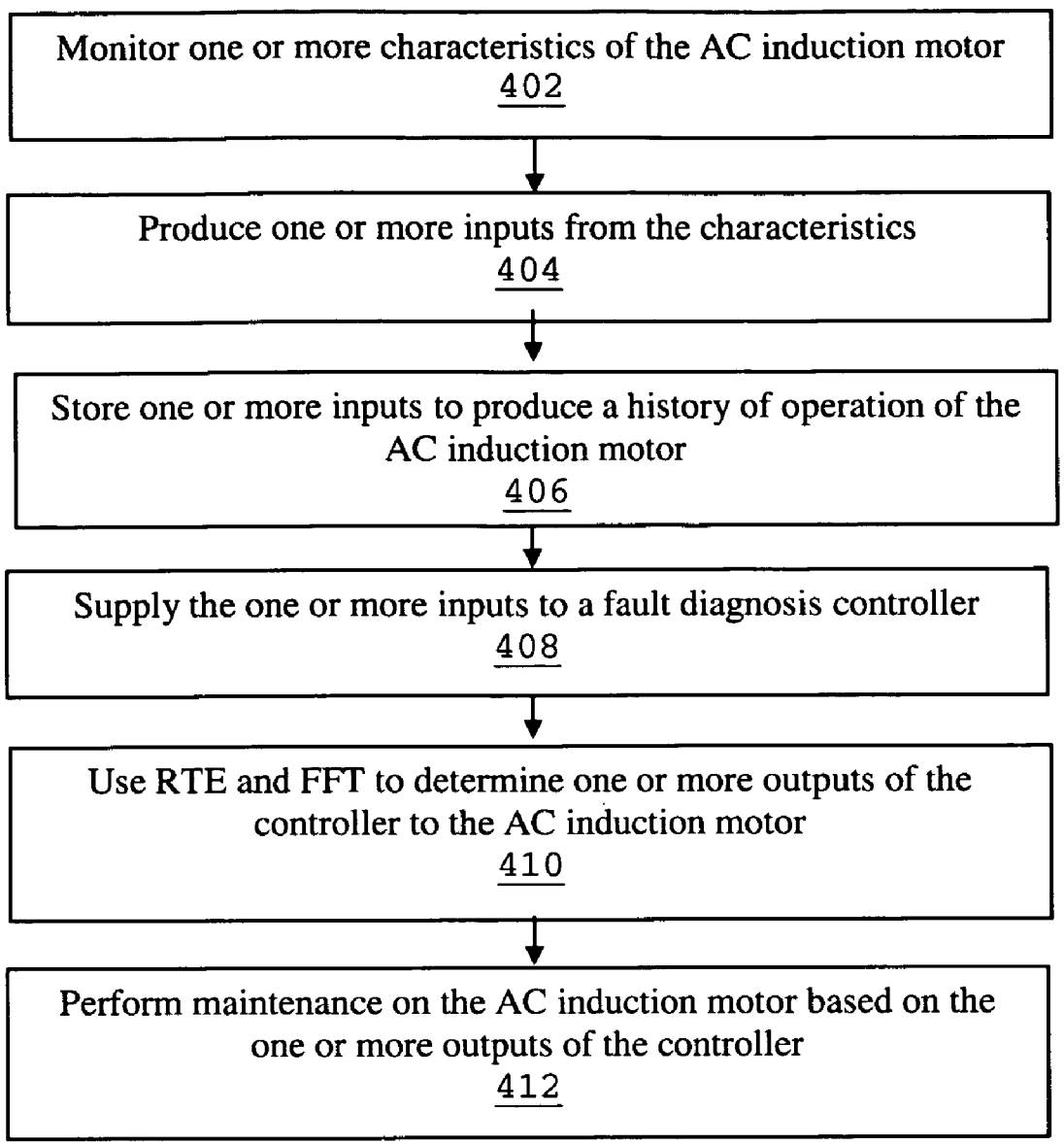

AC MOTOR CONTROLLER

CROSS REFERENCE TO RELATED APPLICATIONS

This application is related to U.S. Provisional Patent Application No. 60/727,468 filed Oct. 17, 2005 entitled "INTELLIGENT SOFT STARTERS FOR AC INDUCTION MOTOR", which is incorporated fully herein by reference.

TECHNICAL FIELD

The present invention relates generally to AC induction motors, and more particularly to regulation of the AC induction motor.

BACKGROUND INFORMATION

Direct on-line starting of Alternating Current (AC) induction motors causes harmful stress to upstream power supply systems and downstream mechanical systems. Solid-state soft starters providing voltage with reduced amplitude are used to ease that stress. AC induction motors are the workhorses in today's industries. AC induction motors have been widely used in different applications, for example, air compressors, centrifugal pumps, conveyors, cutting machinery, and so forth. These applications often may require soft starters to provide a smooth start for very diverse downstream mechanical systems. In current practice, systems have been providing operators with adjustable parameters such as starting voltage, starting current, deceleration time, and acceleration time via potentiometers, dip switches, or keypads. These systems also open the door to wrong settings that lead to unsatisfactory performance and the possibility of additional damage.

In current practice, voltage ramp algorithm and current limit algorithm are used to address variable load applications and constant load applications respectively. PID controllers are used in the algorithms for closed loop control. Because of nonlinearity of AC induction motors and uncertainty of their loads, conventional PID controllers alone are not capable of providing optimal control of AC induction motors. For instance, the standard voltage ramp algorithm currently used in industrial soft starters may not guarantee substantial reduction of torque and current peak values and may lose control at the end of soft start where the motor may become underdamped and power factor changes rapidly.

Unscheduled motor shutdowns are costly; hence it is of great interest that the motor controllers are also able to predict motor incipient faults. This invention presents an intelligent motor control algorithm that can provide not only soft start/soft stop but also prognosis on motor electrical, thermal, and mechanical faults.

Accordingly, an efficient and effective system and method is needed for regulating AC induction motors. In view of the foregoing, it is desirable to provide a system and method that minimizes operator involvement in adjusting soft starts. An intelligent soft start algorithm that would automatically adjust to different load characteristics is desired. A system and method may also prevent costly, unscheduled motor shutdowns.

SUMMARY

The present invention is a novel device, system, and method for monitoring one or more characteristics of the AC induction motor. The exemplary method may monitor for one or more characteristics of the AC induction motor and produces one or more inputs from the characteristics. The one or more inputs are supplied to a fuzzy logic controller. The fuzzy logic controller uses fuzzy logic to determine one or more outputs. The outputs are used to regulate the AC induction motor.

The invention may include the following embodiments. In one exemplary embodiment, the one or more outputs are firing angles of a control rectifier of the AC induction motor. In another embodiment, the one or more characteristics monitored are the line voltage on each of three phases. In another embodiment, the one or more outputs are power factors of the AC induction motor. In another embodiment, the one or more outputs regulate current drawn by the AC induction motor. In another embodiment, the one or more outputs set current limits drawn by the AC induction motor. In yet another embodiment, the one or more characteristics monitored are terminal voltages on each of three phases. In another embodiment, the one or more characteristics monitored are currents of each stator of the AC induction motor.

It is important to note that the present invention is not intended to be limited to a system or method which must satisfy one or more of any stated objects or features of the invention. It is also important to note that the present invention is not limited to the exemplary embodiments described herein. Modifications and substitutions by one of ordinary skill in the art are considered to be within the scope of the present invention, which is not to be limited except by the following claims.

BRIEF DESCRIPTION OF THE DRAWINGS

These and other features and advantages of the present invention will be better understood by reading the following detailed description, taken together with the drawings herein:

FIG. 3 is a flow chart of a method according to a first exemplary embodiment of the present invention.

FIG. 4 is a flow chart of a method according to a second exemplary embodiment of the present invention.

DETAILED DESCRIPTION

Figure 1:
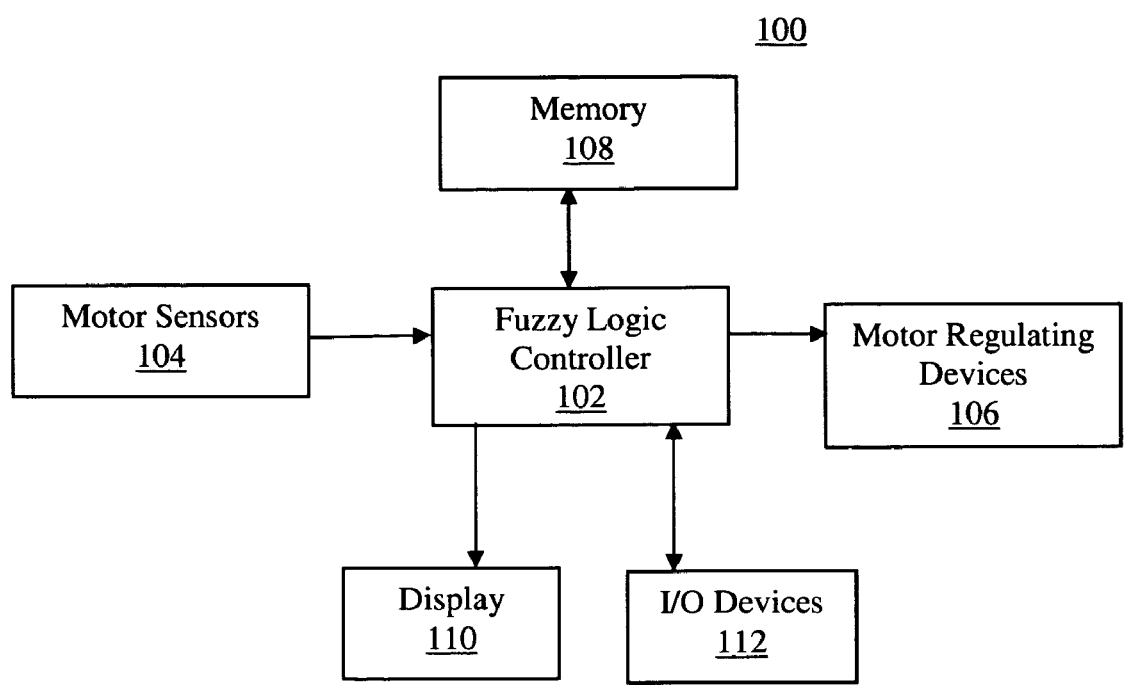
FIG. 1 is a block diagram of a system according to the exemplary fuzzy logic controller embodiment 100 of the present invention.

Referring to FIG. 1, the system 100 may have a fuzzy logic controller 102. The fuzzy logic controller 102 receives input from sensors of the motor 104. To allow the invention to be applied both in-line and inside-delta, three phase control may be needed. The proposed algorithms hence may need motor sensors 104 for 3 line voltages, 3 motor terminal voltages, and/or 3 stator currents, which may be supplied as analog inputs. The fuzzy logic controller 102 applies If . . . then logic as will be discussed later herein to produce output. The output may be used to control the motor with motor regulating devices 106, for example, one of the outputs of the fuzzy logic controller 102 may be firing angles of Silicon Controlled Rectifiers (SCRs).

Architecturally, aspects of the fuzzy logic controller 102 can be located on a server, workstation, minicomputer, or microprocessor. Aspects of the invention can also be located on a stand-alone device, for example in AC motor monitoring system or combined within an AC motor system. Generally, the fuzzy logic controller 102, in terms of hardware architecture, includes a processor, memory 108, display 110 and one or more input and/or output (I/O) devices (or peripherals) 112 that are communicatively coupled via a local interface. The local interface can be, for example, one or more buses or other wired or wireless connections, as is known in the art. The local interface may have additional elements, which are omitted for simplicity, such as controllers, buffers (caches), drivers, repeaters, and receivers, to enable communications. Further, the local interface may include address, control, and/or data connection to enable appropriate communications among the components of a network. The systems and methods may be hardwired with the computer to allow them to perform various aspects of the invention, for example, additional devices may be used to convert analog inputs into discrete values that may be used by the fuzzy logic controller 102.

The systems and methods may also be incorporated in software used with a microprocessor. The software may be stored or loaded in the memory and may include one or more separate programs, each of which comprises an ordered listing of executable instructions for implementing the methods and systems of the invention. The software may work in conjunction with an operating system. The operating system essentially controls the execution of the computer programs, such as the software stored within the memory, and provides scheduling, input-output control, file and data management, memory management, and communication control and related services.

The systems and methods may also include a Graphic User Interface (GUI) to provide a user-friendly interface which allows a user to select a current status of the motor application. The selection of a current status activates specific rules based on the current status selection.

Unlike the Objective of using AC drives, which requires accurate speed control, the objectives of the fuzzy logic controller 102 using exemplary soft start algorithms are to prevent voltage dip of power grid and shock vibration of the mechanical system. These objectives only pose qualitative requirements, which make fuzzy logic control a good candidate. Therefore, this system uses fuzzy control for acceleration and deceleration. The algorithm may adaptively set current limits and automatically compute SCR firing angle based on voltages across SCRs, motor currents, power factor, and change of these values.

Fuzzy logic controls may be described by a set of IF . . . THEN rules and tends to mimic human thinking. Fuzzy logic based control is based on mathematical theory, which makes it nonlinear and adaptive in nature. No motor parameters may be needed in fuzzy logic control. For fuzzy logic control, fuzzy inference rules that need to be developed may be based on insightful knowledge of the system. Although no model is needed for fuzzy logic control, insights on the system may always be indispensable. The inference rules selected have to be comprehensive enough to cover all possible scenarios.

Figure 2:
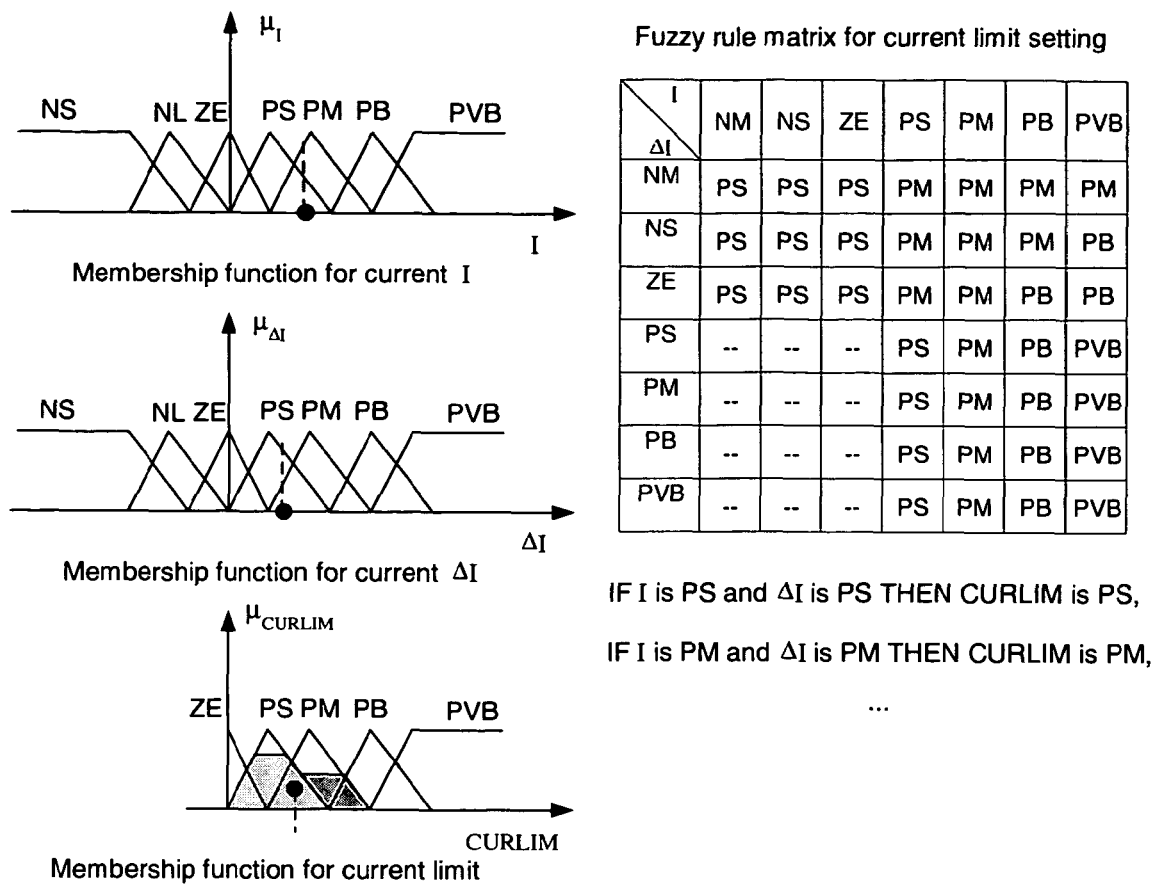
FIG. 2 is a membership function for current I, a membership function for current ΔI, a membership function for current limit, and fuzzy rule matrix for the current limit setting according to an exemplary embodiments of the present invention.

Referring to FIG. 2, the fuzzy logic controller 102 may automatically adjust current limit settings during starting. First the digital values of current I and change of current ΔI are fuzzified into positive small (PS), positive big (PB) alike linguistic terms based on membership functions. Then, inference rules listed in the table are used to locate the area of CURLIUM on the membership function. Finally, a center of gravity method is used to de-fuzzify the CURLIM value.

Similar fuzzy controllers can be designed for change of firing angle. Several fuzzy controllers may work together to achieve optimal control of the motor. Each controller may regulate various aspects of the motor.

Referring for FIG. 3, a first exemplary embodiment 300 may be used to control the acceleration and/or deceleration of an AC induction motor. The one or more motor sensors 104 monitor one or more characteristic of the AC induction motor (block 302). The characteristics may be converted into one or more inputs that may be utilized by the fuzzy logic controller 102, for example, converting analog signals into discrete incremental values or other required filtering (block 304). The one or more inputs are supplied to the fuzzy logic controller 102 (block 306). The fuzzy logic controller 102 applies fuzzy logic to determine one or more outputs as disclosed in the example associated with FIG. 2 (block 308). The outputs may be used to regulate the AC induction motor, for example, the SCR firing angles may be adjusted (block 310).

When motors are up to speed, the SCRs may be full on or by-passed to avoid any harmonics problems. All the power of digital signal processing can then be dedicated to fault diagnosis/prognosis. For example, a fault diagnosis controller may be used for thermal fault prediction. The fault diagnosis controller may be accomplished with the same microprocessor as the fuzzy logic controller 102 or may be performed by another microprocessor. For small induction machines (<50 hp), the maximum temperature limit of the stator may be reached before that of the rotor in both transient and running overload conditions, whereas large induction machines (>100 hp) may be stator limited under running overload conditions, and rotor limited under transient overload conditions. In order to predict thermal faults, both stator temperature and rotor temperature may be estimated. There are two technologies to estimate motor temperatures, namely resistance-based temperature estimation (RTE and conventional thermal model-based temperature estimation (TMTE).

TMTE models the motor as a thermal network from frame, to stator, then to rotor. Thermal resistance and capacitance for each component are computed from motor dimensions and material heat transfer coefficients. Heat input is computed from motor terminal voltage, current, and motor equivalent circuit parameters. Some AC drives on the market have built in TMTE. The major disadvantage of TMTE is that it assumes constant thermal resistance and capacitance. If there is a blocked cooling fan, thermal characteristics of the motor will change significantly and TMTE may not be able to accurately estimate the temperatures. Because electrical resistances of stator and rotor windings are direct indicators of their temperatures, RTE uses dynamic modeling of induction motor to estimate stator and rotor winding resistances based on measured motor terminal voltage and current. Unlike TMTE, RTE can estimate temperature under abnormal cooling conditions. TMTE can estimate temperatures at specific points where RTE can only give average temperatures of rotor and stator.

For thermal fault prediction or temperature estimation, the fault diagnosis controller may use RTE for it can predict temperature even when abnormal cooling circumstances happen. That is also the reason that RTE will provide better thermal protection than over current relays using trip class curves. RTE model parameters can also be relatively easier to obtain.

The fault diagnosis controller may also be used for mechanical fault prediction of the motor. Mechanical faults such as broken rotor bars, worn out bearings, and misaligned shaft may introduce certain frequency components in stator currents as shown in the table below.

| Diagnosis Category | Faults | Characteristic Frequency |
|---|---|---|
| Low part $(0-5f_r)$ | Broken rotor bar | $f_b = (1 \pm 2ks) f$ |
|  | Air gap eccentricity | $f_e = [(kR \pm n_d)(1-s)/p \pm v] f$ |
|  | Bolt loosening | $0.5f_r, f_r, 2f_r, 3f_r$ |
|  | Oil ship | $0.4f_r - 0.45f_r$ |
| High part (>1 KHz) | Bearing inner race defect | $f_i = Zf_r/2 (1 + (d/D) \cos\alpha)$ |
|  | Bearing outer race defect | $f_o = Zf_r/2 (1 - (d/D) \cos\alpha)$ |
|  | Ball defect | $f_b = Zf_r/d (1 - (d^2/D^2) \cos^2\alpha)$ |

Where
- $f_r$    Motor rotation frequency;
- k    1, 2, 3, . . .;
- s    motor slip;
- f    power supply frequency;
- R    number of rotor slots;
- $n_d$    0 in case of static eccentricity; 1, 2, 3, . . . in case of dynamic eccentricity;
- p    number of pole pairs;
- v    stator MMF harmonics that present in the supply;
- D    diameter of pitch circle;
- Z    number of balls in the bearing;
- d    diameter of the ball;
- α    contact angle in radians.

This invention may use Fast Fourier Transform and/or wavelet transformation technologies to extract features of motor stator currents in both time domain and frequency domain. The fault diagnosis controller may use these inputs to provide outputs for maintenance of the motor. The system may also be used to provide power metering and history logging. One prognosis technique may include recording the motor operational data in memory 108, including patterns of power or current consumption, number of and the intervals between starts and stops, and so forth. This data may be readily available to microprocessor of the fault diagnosis controller. Furthermore, the fault diagnosis controller can perform power metering by implementing algorithms to calculate frequency, power factor, etc. Preventive maintenance can then be scheduled based on those recorded operational data to effectively reduce unplanned down-time.

Referring to FIG. 4, a second exemplary embodiment 400 may be used to control the maintenance of an AC induction motor. The one or more motor sensors 104 monitor one or more characteristics of the AC induction motor (block 402). The characteristics may be converted into one or more inputs that may be utilized by the fault diagnosis controller, for example, converting analog signals into discrete incremental values or other required filtering (block 404). The one or more inputs may be stored in memory 108 to produce a history of operation of the AC induction motor (block 406). The one or more inputs are supplied to the fault diagnosis controller (block 408). The fault diagnosis controller determines one or more outputs, for example, when to shut down operation of the motor due to thermal limits (block 410). The outputs may be used to perform or regulate the AC induction motor (block 412).

The systems and methods may be implemented using hard-wired modules or programmable hardware. The systems and methods may be implemented within software that utilizes various components to implement the embodiments described herein. Aspects disclosed in the exemplary embodiment may be utilized independently or in combination with other exemplary embodiments. Moreover, it will be understood that the foregoing is only illustrative of the principles of the invention, and that various modifications can be made by those skilled in the art without departing from the scope and spirit of the invention. Persons skilled in the art will appreciate that the present invention can be practiced by other than the described embodiments, which are presented for purposes of illustration rather than of limitation, and the present invention is limited only by the claims that follow.

What is claimed is:

1. A method for monitoring an AC induction motor, comprising:
    monitoring one or more characteristics of the AC induction motor;
    producing one or more inputs from the characteristics;
    supplying the one or more inputs to a motor controller;
    using fuzzy logic to determine one or more outputs of the controller to the AC induction motor; and
    controlling acceleration and deceleration of the AC induction motor to start and stop the AC induction motor by regulating the AC induction motor based on the one or more outputs of the controller determined using fuzzy logic.

2. The method of claim 1, wherein the one or more outputs are firing angles of a control rectifier of the AC induction motor.

3. The method of claim 1, wherein the one or more characteristics monitored are the line voltage on each of three phases.

4. The method of claim 1, wherein the one or more outputs is a power factor of the AC induction motor.

5. The method of claim 1, wherein the one or more outputs regulate current drawn by the AC induction motor.

6. The method of claim 1, wherein the one or more outputs set current limits drawn by the AC induction motor.

7. The method of claim 1, wherein the one or more characteristics monitored are terminal voltages on each of three phases.

8. The method of claim 1, wherein the one or more characteristics monitored are currents of each stator of the induction motor.

9. The method of claim 1, wherein using fuzzy logic to determine output of the controller reduces voltage dip in a power grid supplying power to the AC induction motor.

10. The method of claim 1, wherein using fuzzy logic to determine output of the controller reduces shock to mechanical systems of the AC induction motor.

11. A system for monitoring an AC induction motor, comprising:
    one or more sensors for monitoring characteristics of the AC induction motor and producing one or more inputs from the characteristics;
    a fuzzy logic motor controller for receiving the one or more inputs and determining one or more outputs using fuzzy logic; and
    a regulator for controlling acceleration and deceleration of the AC induction motor to start and stop the AC induction motor based on the one or more outputs of the fuzzy logic controller.

12. The system of claim 11, wherein the one or more outputs are firing angles of a control rectifier of the AC induction motor.

13. The system of claim 11, wherein the one or more characteristics monitored are the line voltage on each of three phases.

14. The system of claim 11, wherein the one or more outputs is a power factor of the AC induction motor.

15. The system of claim 11, wherein the one or more outputs regulate current drawn by the AC induction motor.

16. The system of claim 11, wherein the one or more outputs set current limits drawn by the AC induction motor.

17. The system of claim 11, wherein the one or more characteristics monitored are terminal voltages on each of three phases.

18. The system of claim 11, wherein the one or more characteristics monitored are currents of each stator of the induction motor.

19. The system of claim 11, the fuzzy logic controller determines output to reduce voltage dip in a power grid supplying power to the AC induction motor.

* * * * *